United States Patent [19]

Kessel

[11] Patent Number: 5,252,210
[45] Date of Patent: Oct. 12, 1993

[54] PAINT INTAKE FILTER GUARD

[75] Inventor: Kenneth C. Kessel, Plymouth, Minn.

[73] Assignee: Wagner Spray Tech Corporation, Minneapolis, Minn.

[21] Appl. No.: 941,953

[22] Filed: Sep. 15, 1992

[51] Int. Cl.$^5$ .................................................. B01D 35/02
[52] U.S. Cl. ........................................ 210/452; 210/460; 210/497.3; 210/499; 55/525
[58] Field of Search .................. 55/525; 210/452, 459, 210/460, 497.3, 499

[56] References Cited

U.S. PATENT DOCUMENTS

| 2,260,874 | 10/1941 | Van Pelt | 210/452 |
| 2,658,625 | 11/1953 | Rafferty | 210/499 |
| 4,442,003 | 4/1984 | Holt | 210/499 |
| 4,861,478 | 8/1989 | Hall | 210/460 |
| 5,188,731 | 2/1993 | Lapoint | 210/452 |

Primary Examiner—Robert A. Dawson
Assistant Examiner—W. L. Millard
Attorney, Agent, or Firm—Faegre & Benson

[57] ABSTRACT

The invention is a filter assembly which includes (a) an open-ended three-dimensional filter medium defining an internal chamber, (b) a collar sealingly contacting the open end of the filter medium with an access port extending through the collar in fluid communication with the internal chamber, and (c) a plurality of peripherally spaced protective columns extending along and spaced outwardly from the sidewall of the filter medium with each protective column having a proximal end coupled to the collar and a distal end extending beyond the closed end of the filter medium.

20 Claims, 2 Drawing Sheets

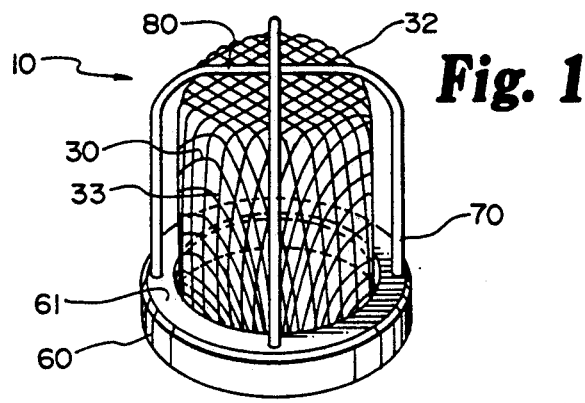
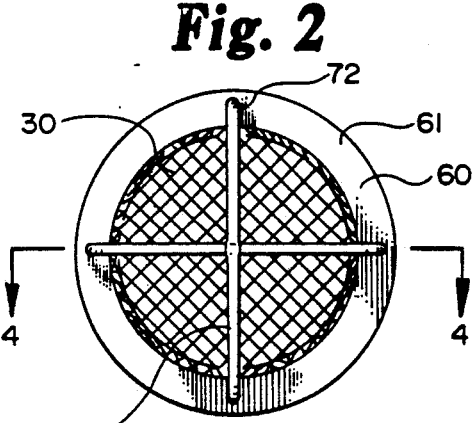
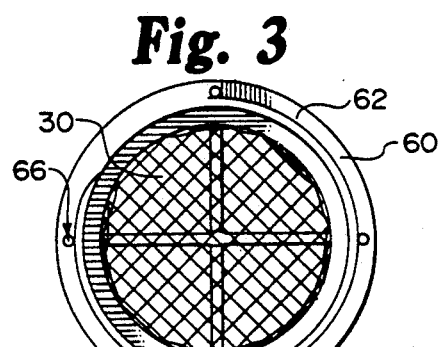
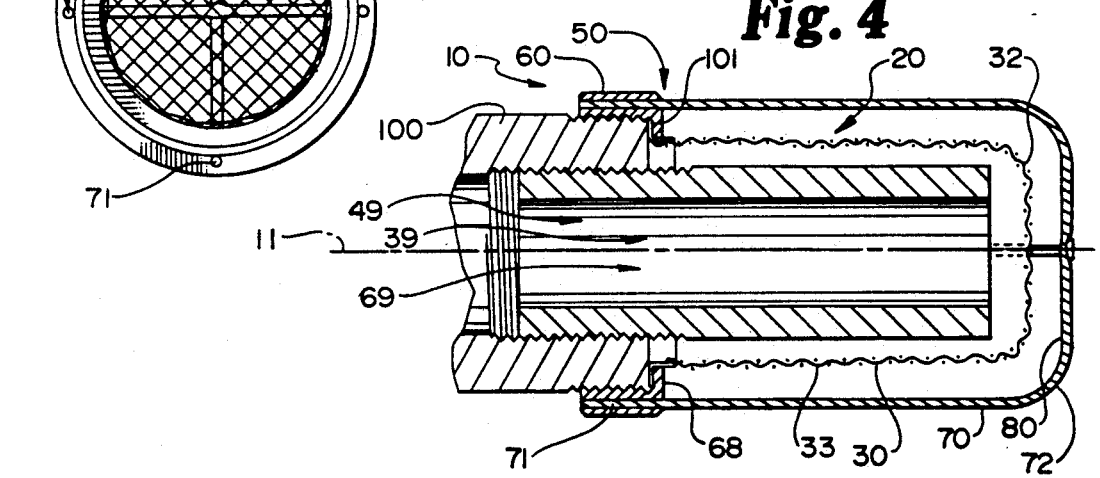
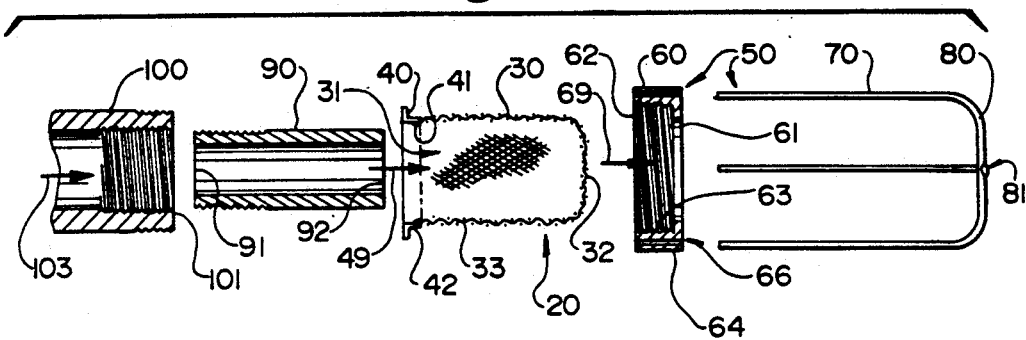

PAINT INTAKE FILTER GUARD

FIELD OF THE INVENTION

Broadly, the invention relates to protective housings for filter media. Specifically, the invention relates to protective enclosures for the paint intake filters on paint spraying power equipment.

BACKGROUND

Commercial and industrial paint spraying equipment employs a suction tube extending from the inlet port of the paint pump for withdrawing paint directly from a paint shipping container or other similar receptacle. A three-dimensional screen or filter is typically attached to the remote end of the suction tube for removing particulate matter from the paint before the paint enters the equipment. In order to position the remote end of the suction tube near the bottom of the paint container and thereby reduce the volume of unrecoverable paint between the remote end of the suction tube and the bottom of the paint container, the remote end of the suction tube is commonly projected into the internal chamber defined by the filter.

Unfortunately, the remote end of the suction tube on paint spraying equipment is susceptible to receiving frequent physical abuse during transportation and use of the equipment. Such physical abuse commonly results in structural damage to the filter medium surrounding the remote end of the suction tube with a resultant reduction in the functional surface area of the filter medium and occasional rupturing of the filter medium with resultant loss of filtration efficiency.

In order to achieve projection of the suction tube into the internal chamber defined by the filter medium, the suction tube is threaded continuously along the remote end for a distance sufficient to permit the filter assembly to travel the necessary distance along the tube. While effective for achieving the desired extension of the suction tube into the internal chamber, paint tends to collect within the threads on the suction tube and cannot be easily removed due to the inaccessible positioning of the tube within the filter. Once permitted to dry it becomes very difficult to remove the filter assembly from the suction tube.

Accordingly, a substantial need exists for (i) an inexpensive apparatus capable of protecting the filter medium against structural damage resulting from sudden contact between the filter medium and another object, and (ii) an inexpensive mechanism for sealingly securing the filter to the remote end of a paint sprayer suction tube with the remote end of the tube to projecting into the internal chamber defined by the filter medium which permits simple and easy removal and replacement of the filter after prolonged and repeated exposure of the mechanism to the media to be filtered including specifically, but not exclusively, latex paints, oil-based paints, block fillers and other pumpable coating compositions.

SUMMARY OF THE INVENTION

The invention is a filter assembly which includes (a) an open-ended three-dimensional filter medium defining an internal chamber, (b) a collar sealingly contacting the open end of the filter medium with an orifice extending through the collar in fluid communication with the internal chamber, and (c) at least one column extending along and spaced outwardly from the sidewall of the filter medium with a proximal end coupled to the collar and a distal end extending beyond the closed end of the filter medium.

The filter medium may be either outwardly flanged at the open end or secured at the open end to a support ring having an outwardly projecting flange. The outwardly projecting flange positions the filter medium relative to the collar and protective column by either contacting an inner annular flange extending from the collar into the orifice through the collar or contacting the coupling end of the collar.

When the filter assembly is attached to paint spraying equipment the collar of the assembly sealingly engages the suction tube component of the equipment with the tube extending through the orifice in the collar and into fluid communication with the internal chamber defined by the filter medium.

The filter assembly may be threadably secured to the suction tube either directly or through the utilization of a bearing or reducer. The filter assembly may also be secured to the suction tube by alternate means including specifically, but not exclusively, a bayonet type mounting arrangement. When secured directly, the collar threadably engages the remote end of the suction tube. Optionally, a tube extension may be extended from the remote end of the suction tube into the internal chamber defined by the filter medium to position the opening into the bore of the suction tube proximate the closed end of the filter medium. The filter medium is secured in position by confining the outwardly flanged open end of the filter medium between an inner annular flange extending from the collar and the remote end of the suction tube.

When secured by a bearing, an externally threaded bearing is attached to the suction tube proximate the remote end of the tube and the collar threadably engaged to the bearing with the suction tube extending through the bearing and the collar and into the internal chamber defined by the filter medium. The filter medium is secured in position by confining the outwardly flanged open end of the filter medium between an inner annular flange extending from the collar and the front surface of the bearing.

When secured by a reducer, the smaller end of the reducer is attached to the suction tube proximate the remote end of the tube and the collar threadably engaged within the larger diameter end of the reducer with the suction tube extending through the reducer and the collar and into the internal chamber defined by the filter medium. The filter medium is secured in position by confining the outwardly flanged open end of the filter medium between the coupling end of the collar and the reduction flange of the reducer.

BRIEF DESCRIPTION OF THE DRAWINGS

FIG. 1 is a perspective view of a first embodiment of the invention.

FIG. 2 is a top view of the invention of FIG. 1.

FIG. 3 is a bottom view of the invention of FIG. 1.

FIG. 4 is a cross-sectional view of the invention depicted in FIG. 1 taken along line 4—4 with the invention threaded onto a suction tube.

FIG. 5 is a cross-sectional exploded view of the invention as depicted in FIG. 4 with the suction tube, tube extension, filter, collar, and columns detached.

DETAILED DESCRIPTION OF THE INVENTION INCLUDING A BEST MODE

First Embodiment

Figure 6:
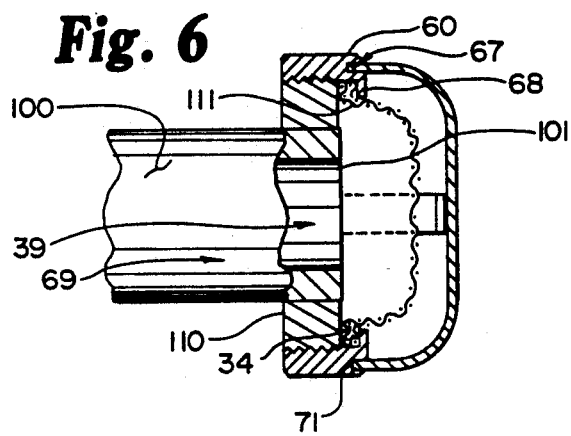
FIG. 6 is a cross-sectional view of a first aspect of a second embodiment of the invention.

Referring to FIGS. 1-5, a first aspect of a filtration assembly 10 includes independently constructed filter subassembly 20 and protective enclosure 50. The filter subassembly 20 includes an open-ended, three-dimensional filter medium 30 attached along the periphery of the open end 31 to a support ring 40. The protective enclosure 50 includes a collar 60 with four longitudinally parallel and peripherally spaced protective columns 70 extending from a forward end 61 of the collar 60 with a proximal end 71 of the columns 70 coupled to the collar 60 and a distal end 72 gradually angled into crossbars 80 which interconnect contralateral pairs of columns 70. The protective enclosure 50 may be constructed with a single column 70 in order to achieve partial protection at a substantial cost savings.

The Independent nature of the filter subassembly 20 and protective enclosure 50 permits replacement of the relatively inexpensive filter subassembly 20 without requiring replacement of the relatively expensive protective enclosure 50.

Operable configuration of the filter subassembly 20 within the protective enclosure 50 positions the filter medium 30 between the protective columns 70 with the protective columns 70 outwardly spaced from a sidewall 33 of the filter medium 30 and the crossbars 80 upwardly spaced from a closed end 32 of the filter medium 30.

The filter medium 30 is a three-dimensional cylindrical wire mesh screen having an open end 31, a closed end 32, and a sidewall 33. The filter medium 30 defines an internal chamber 39 which is accessible through the open end 31. The filter medium 30 should be effective for providing a flow rate of at least about 2 gallons (about 8 liters) of latex paint per minute while removing substantially all particulate matter from the paint with linear dimensions of at least about 0.08 inches (about 2 mm) in all directions. The filter medium 30 may be constructed from any of the well known filtration media which meet these filtration parameters, are compatible with the coating media to be filtered, and possess sufficient structural integrity, including specifically, but not exclusively, wire mesh. The filter medium 30 may be configured to substantially any desired three-dimensional shape, including cubic, rectangular, spherical, and cylindrical. For purposes of facilitating continued discussion of this invention, the remainder of this specification shall be based upon a cylindrically configured wire mesh filter medium 30.

The filter medium 30 may be conveniently shaped by simply conforming a sheet of the appropriately sized wire mesh to an appropriately shaped plug and trimming any excess wire from the edges of the open end 31.

The open end 31 of the filter medium 30 is attached to an inner surface 41 of the support ring 40 to form the filter subassembly 20. The filter medium 30 may be attached to the support ring 40 by any of the well-known conventional techniques, including specifically, but not exclusively, soldering, welding and adhesive bonding. An outer annular peripheral flange 42 extends from the support ring 40 for contacting an inner annular flange 68 extending from the collar 60 into an access port 69 defined by the collar 60. The support ring 40 defines a central orifice 49 which permits access to the internal chamber 39 defined by the filter medium 30.

The filter subassembly 20 is operably positioned surrounding a remote end 101 of a suction tube 100 on a paint sprayer (not shown) by a collar 60. The access port 69 of the collar 60 aligns with the central orifice 49 defined by the support ring 40 when the collar 60 and filter subassembly 20 are operably positioned on the suction tube 100. An inner surface 63 of the collar 60 is threaded for direct coupling of the collar 60 onto the remote end 101 of the suction tube 100. The inner annular flange 68 extending from the collar 60 is positioned proximate the forward end 61 of the collar 60 for retentively contacting the outer annular peripheral flange 42 on the support ring 40 when the filter subassembly 20 is operably positioned relative to the collar 60. The collar 60 secures the filter subassembly 20 into operable position by confining the outer annular peripheral flange 42 of the support ring 40 between the inner annular flange 68 on the collar and the remote end 101 of the suction tube 100 when the collar 60 is threaded onto the suction tube 100.

The filter medium 30 is protectively encased by longitudinal columns 70. The proximal ends 71 of the columns 70 are secured within longitudinal bores 66 extending into the collar 60 from the forward end 61. The columns 70 may be secured within the longitudinal bores 66 by any of the well-known conventional techniques, including specifically, but not exclusively, soldering, welding, adhesive bonding, friction fit and crimping.

The columns 70 extend from the collar 60 a distance sufficient to position the distal ends 72 of the columns 70 beyond the closed end 32 of the filter medium 30 when the filter subassembly 20 is operably configured within the protective enclosure 50. Optimum protection is provided by equidistantly spacing the columns 70 around the periphery of the collar 60 with each pair of diametrically opposed columns 70 interconnected at the distal ends 72 by crossbars 80. Such a configuration provides protection for substantially the entire filter medium 30 without substantially interfering with the flow of paint into contact with the entire surface area of the filter medium 30. The crossbars 80 are preferably crimped at the point 81 where they contact one another in order to further strengthen the crossbar assembly 80. The columns 70 and crossbars 80 may be alternately configured, such as by interconnecting peripherally adjacent columns 70 with crossbars 80, but would not provide optimum protection. As depicted in FIG. 1, a pair of contralateral columns 70 and attendant crossbar 80 may be conveniently constructed by bending a single length of al least about 12 metric gauge steel wire.

The columns 70 and crossbars 80 are positioned with respect to the collar 60 so as to be outwardly spaced from the filter medium 30 when the filter subassembly 20 is operably configured within the protective enclosure 50. Such spacing permits paint to contact the surface area of the filter medium 30 located immediately underneath the columns 70 and crossbars 80.

The protective enclosure 50, including the collar 60, columns 70, and crossbars 80, may be constructed from substantially any material which is compatible with the coating to be filtered and possesses the necessary structural integrity. These components may be constructed from different materials but are preferably constructed from a single substance. Based upon a combination of reasonable cost, ease of availability, high structural strength and compatibility with most coating compositions including latex and oil-based paints, the materials of choice are plated steel and stainless steel.

A tube extension 90 threadably engages the remote end 101 of the suction tube 100 for extending a bore 103 defined by the suction tube 100 into the internal chamber 39 defined by the filter medium 30. The tube extension 90 is externally threaded at a proximal end 91 for permitting threaded engagement of the tube extension 90 to internal threading on the remote end 101 of the suction tube 100. The distal end 92 of the tube extension 90 extends into the internal chamber 39 defined by the filter medium 30 proximate the closed end 32 of the filter medium. The tube extension 90 is necessary as the inner annular flange 68 on the collar prevents continued insertion of the suction tube 100 into the internal chamber 39. The outside diameter of the tube extension 90 is smaller than the outside diameter of the suction tube 100 in order to permit passage of the tube extension 90 past the inner annular flange 68 on the collar 60.

Optionally, the filter medium 30 and collar 60 may be configured to define a shallow internal chamber 39 having an enlarged diameter so as to dispense with the need for a tube extension 90 without a substantial decrease in the surface area of the filter medium or a substantial increase in the longitudinal 11 distance between the remote end 101 of the suction tube 100 and the closed end 32 of the filter medium 30.

Second Embodiment

First Aspect

Referring to FIG. 6, a second aspect of the filtration assembly 10 includes independently constructed filter medium 30 and protective enclosure 50. The protective enclosure 50 comprises a collar 60 with four longitudinally parallel and peripherally spaced protective columns 70 extending from a forward end 61 of the collar 60 with a proximal end 71 of the columns 70 coupled to the collar 60 and a distal end 72 preferably gradually radiused into crossbars 80 which interconnect contralateral pairs of columns 70. Operable configuration of the filter medium 30 within the protective enclosure 50 positions the filter medium 30 between the protective columns 70 with the protective columns 70 outwardly spaced from a sidewall 33 of the filter medium 30 and the crossbars 80 upwardly spaced from a closed end 32 of the filter medium 30.

The construction and configuration of the filter medium 30 is substantially the same as the filter medium 30 described in connection with the first aspect of the invention except that the support ring 40 is eliminated and the open end 31 of the filter medium 30 bent to form an outward peripheral flange 34. The outward peripheral flange 34 is doubled back upon itself to provide a smooth outer periphery. The outward peripheral flange 34 is effective for contacting an inner annular flange 68 extending from the collar 60 into an access port 69 defined by the collar 60.

The filter medium 30 is operably positioned surrounding a remote end 101 of a suction tube 100 on a paint sprayer by the collar 60. The access port 69 through the collar 60 provides access to an internal chamber 39 defined by the filter medium 30. An inner surface 63 of the collar 60 is threaded for coupling of the collar 60 onto a bushing 110 attached proximate the remote end 101 of the suction tube 100. The inner annular flange 68 on the collar 60 is positioned proximate the forward end 61 of the collar 60 for retentively contacting the outward peripheral flange 34 on the filter medium 30. The collar 60 secures the filter medium 30 into operable position by confining the outward peripheral flange 34 on the filter medium 30 between the inner annular flange 68 on the collar and a forward end 111 of the bushing 110 when the collar 60 is threaded onto the bushing 110.

The filter medium 30 is protectively encased by longitudinal columns 70 and crossbars 80 which are constructed, configured and positioned substantially the same as the columns 70 and crossbars 80 described in connection with the first aspect of the invention except that the columns 70 and crossbars 80 are flattened bands formed as a unitary cast body. The proximal ends 71 of the columns 70 are secured within longitudinal slots 67 extending into the collar 60 from the forward end 61.

The externally threaded bushing 110 is attached to the suction tube 100 at the remote end 101 of the tube 100 such that the tube 100 does not extend into the internal chamber 39 defined by the filter medium 30. The shallow configuration of the filter medium 30 inherently positions the remote end 101 of the tube 100 proximate the closed end 32 of the filter medium 30 without requiring the tube 100 to extend into the internal chamber 39 defined by the filter medium 30. The bushing 110 may be attached to the suction tube 100 by any of the well-known conventional techniques, including specifically, but not exclusively, soldering, welding, adhesive bonding, friction fit and crimping.

Second Aspect

The second aspect of the second embodiment is similar to the first aspect except that (i) the filter medium 30 is configured with an increased longitudinal 11 depth and decreased diameter, and (ii) the externally threaded bushing 110 is attached to the suction tube 100 a distance from the remote end 101 of the tube 100 sufficient to permit the remote end 101 of the tube 100 to extend into the internal chamber 39 defined by the filter medium 30 proximate a closed end 32 of the filter medium 30.

Third Embodiment

Figure 7:
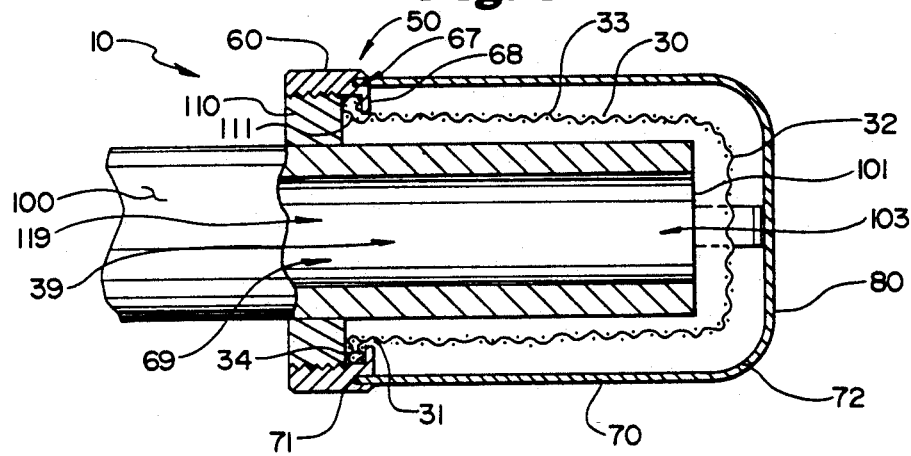
FIG. 7 is a cross-sectional view of a second aspect of the second embodiment of the invention.
Figure 8:
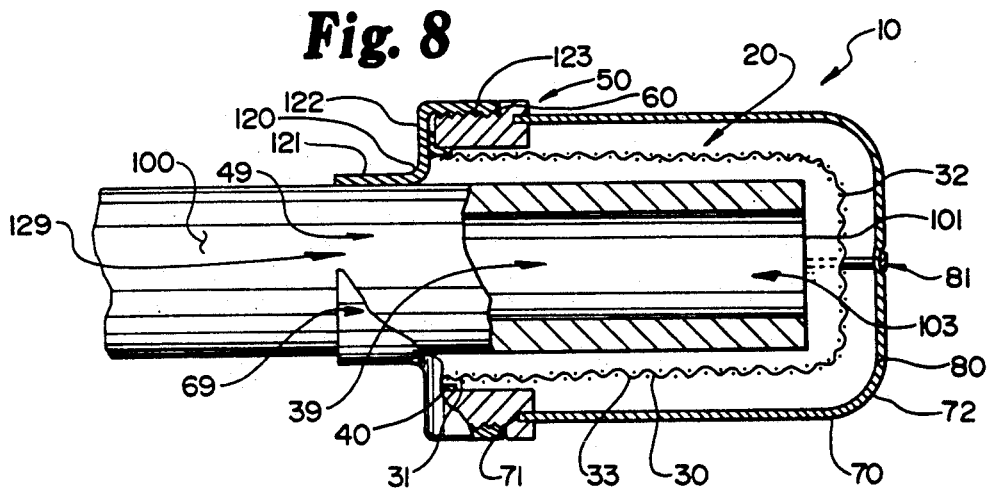
FIG. 8 is a cross-sectional view of a third embodiment of the invention.

Referring to FIG. 7, a third aspect of the filtration assembly 10 includes independently constructed filter subassembly 20 and protective enclosure 50. The filter subassembly 20 is identical to the filter subassembly 20 described in connection with the first aspect of the invention. The protective enclosure 50 is also identical to the protective enclosure 50 described in connection with the first aspect of the invention except for collar 60.

A reducer 120 is attached to a suction tube 100 a distance from a remote end 101 of the tube 100 sufficient to permit the remote end 101 of the tube 100 to extend into an internal chamber 39 defined by a filter medium 30 proximate a closed end 32 of the filter medium 30. The reducer 120 includes a smaller diameter end 121 coupled to the suction tube 100, an internally threaded larger diameter end 123 configured for coupling to the collar 60, and a reduction flange 122 which connects the smaller diameter 121 and larger diameter 123 ends of the reducer 120. The reducer 120 may be attached to the suction tube 100 by any of the well-known conventional techniques, including specifically, but not exclusively, soldering, welding, adhesive bonding, friction fit and crimping.

The filter subassembly 20 is operably positioned surrounding the remote end 101 of the suction tube 100 on a paint sprayer (not shown) by the collar 60. The collar 60 defines an access port 69 which aligns with a central orifice 49 defined by a support ring 40 attached to an open end 31 of the filter medium 30 when the collar 60 and filter subassembly 20 are operably positioned on the suction tube 100. An outer surface 64 of the collar 60 is threaded for coupling of the collar 60 onto the internally threaded larger diameter end 123 of the reducer 120. The collar 60 secures the filter subassembly 20 into operable position by confining an outer annular peripheral flange 42 on the support ring 40 between a coupling end 62 of the collar and the reduction flange 122 of the reducer 120 when the collar 60 is threaded onto the reducer 120.

As described in connection with the second aspect of the second embodiment, the reducer 120 may be similarly positioned at the remote end 101 of the suction tube 100 and the filter medium 30 configured to define a shallow internal chamber 39 having an enlarged diameter.

What is claimed is:

1. A filtration assembly for use upon the suction tube of paint spraying equipment comprising:
   (a) a three-dimensional filter medium having an open end, a closed end, and a sidewall defining an internal chamber;
   (b) a collar sealingly coupled to the open end of the filter medium which has an outer surface defining a periphery and an aperture defining an access port in fluid communication with the internal chamber; and
   (c) protective columns extending along and spaced outwardly from the sidewall of the filter medium with a proximal end coupled to the collar and a distal end extending beyond the closed end of the filter medium for protecting the filter medium from physical damage; the columns spaced around the periphery of the collar so as to provide protection for substantially the entire filter medium without substantially interfering with flow of a paint into contact with the entire surface area of the filter medium.

2. The filtration assembly of claim 1 comprising at least two sets of two contralaterally positioned protective columns.

3. The filtration assembly of claim 2 further comprising a crossbar interconnecting the distal ends of the contralaterally positioned protective columns in each set.

4. The filtration assembly of claim 3 wherein the protective columns are equidistantly spaced around the periphery of the collar.

5. The filtration assembly of claim 1 further comprising a support ring coupled to the open end of the filter medium which has an outer annular flange and an aperture in fluid communication with the internal chamber.

6. The filtration assembly of claim 1 wherein the open end of the filter medium defines an outwardly extending peripheral flange.

7. The filtration assembly of claim 1 wherein the collar is configured to include means for coupling the collar and filter medium which is adapted to release the filter medium as an independent and distinct component capable of separate replacement.

8. A filtration assembly for use upon the suction tube of paint spraying equipment comprising:
   a three-dimensional filter medium having an open end, a closed end, and a sidewall which define an internal chamber;
   (b) a collar sealingly coupled to the open end of the filter medium having an outer surface defining a periphery and an aperture defining an access port in fluid communication with the internal chamber;
   (c) a plurality of peripherally spaced protective columns extending along and spaced outward from the sidewall of the filter medium with each protective column having a proximal end coupled to the collar and a distal end extending beyond the closed end of the filter medium for protecting the filter medium from physical damage; the columns spaced around the periphery of the collar so as to provide protection for substantially the entire filter medium without substantially interfering with flow of a paint into contact with the entire surface area of the filter medium and
   (d) a suction tube having a central bore wherein the suction tube is configured and arranged at a remote end thereof to sealingly engage the collar with the central bore in fluid communication with the access port.

9. The filtration assembly of claim 8 wherein the remote end of the suction tube is sealingly connected to the collar with the central bore in fluid communication with the access port.

10. The filtration assembly of claim 9 wherein the suction tube projects through the access port such that the remote end thereof is positioned within the internal chamber proximate the closed end of the filter medium.

11. The filtration assembly of claim 10 wherein the collar is internally threaded and the suction tube is continuously externally threaded along the remote end. externally threaded bushing coupled to the suction tube proximate the remote end and threaded onto the collar so as to compress the outer annular flange of the support ring between the bushing and the inner annular flange extending from the collar into the inlet port.

12. The filtration assembly of claim 10 wherein the open end of the filter medium is bent so as to define an outwardly extending peripheral flange and the assembly further comprises (i) internal threading on the collar; (ii) an inner annular flange extending from the collar into the inlet port; and (iii) an externally threaded bushing coupled to the suction tube proximate the remote end and threaded onto the collar so as to compress the outwardly extending peripheral flange of the filter medium between the bushing and the inner annular flange extending from the collar into the inlet port.

13. The filtration assembly of claim 10 wherein the open end of the filter medium is bent so as to define an outwardly extending peripheral flange and the assembly further comprises (i) external threading on the collar; and (ii) a reducer having a smaller diameter end sealingly coupled to the suction tube, an internally threaded larger diameter end threaded onto the collar, and a radially extending reduction flange compressing the outwardly extending peripheral flange of the filter medium between the reduction flange and an end of the collar.

14. The filtration assembly of claim 9 further comprising (i) internal threading on the collar; (ii) an inner annular flange extending from the collar into the inlet port; (iii) a support ring coupled to the open end of the filter medium which has an outer annular flange and an aperture in fluid communication with the internal chamber; and (iv) an externally threaded bushing coupled to the suction tube proximate the remote end and threaded onto the collar so as to compress the outer annular flange of the support ring between the bushing and the inner annular flange extending from the collar into the inlet port.

15. The filtration assembly of claim 9 further comprising (i) external threading on the collar; (ii) a support ring coupled to the open end of the filter medium which has an outer annular flange and an aperture in fluid communication with the internal chamber defined by the filter medium; and (iii) a reducer having a smaller diameter end sealingly coupled to the suction tube, an internally threaded larger diameter end threaded onto the collar, and a radially extending reduction flange compressing the outer annular flange of the support ring between the reduction flange and an end of the collar.

16. The filtration assembly of claim 8 wherein the remote end of the suction tube is configured and arranged to project through the access port and into the internal chamber proximate the closed end of the filter medium when the tube and collar are sealingly coupled.

17. The filtration assembly of claim 16 wherein the open end of the filter medium is bent so as to define an outwardly extending peripheral flange and the assembly further comprises (i) internal threading on the collar; (ii) an inner annular flange extending from the collar into the inlet port; and (iii) an externally threaded bushing coupled to the suction tube proximate the remote end; wherein the bushing is configured and arranged to compress the outwardly extending peripheral flange of the filter medium between the bushing and the inner annular flange extending from the collar into the inlet port.

18. The filtration assembly of claim 16 wherein the open end of the filter medium is bent so as to define an outwardly extending peripheral flange and the assembly further comprises (i) external threading on the collar; and (ii) a reducer having a smaller diameter end sealingly coupled to the suction tube, an internally threaded larger diameter end, and a radially extending reduction flange; wherein the larger diameter end of the reducer is configured and arranged to threadably engage the collar and the reduction flange is configured and arranged to compress the outwardly extending peripheral flange of the filter medium between the reduction flange and an end of the collar when the reducer is threadably engaged to the collar.

19. The filtration assembly of claim 8 further comprising (i) internal threading on the collar; (ii) an inner annular flange extending from the collar into the inlet port; (iii) a support ring coupled to the open end of the filter medium which has an outer annular flange and an aperture in fluid communication with the internal chamber; and (iv) an externally threaded bushing coupled to the suction tube proximate the remote end; wherein the bushing is configured and arranged to compress the outer annular flange of the support ring between the bushing and the inner annular flange extending from the collar into the inlet port.

20. The filtration assembly of claim 8 further comprising (i) external threading on the collar; (ii) a support ring coupled to the open end of the filter medium which has an outer annular flange and an aperture in fluid communication with the internal chamber defined by the filter medium; and (iii) a reducer having a smaller diameter end sealingly coupled to the suction tube, an internally threaded larger diameter end, and a radially extending reduction flange; wherein the larger diameter end of the reducer is configured and arranged to threadably engage the collar and the reduction flange is configured and arranged to compress the outer annular flange of the support ring between the reduction flange and an end of the collar when the reducer is threadably engaged to the collar.

* * * * *

UNITED STATES PATENT AND TRADEMARK OFFICE
CERTIFICATE OF CORRECTION

PATENT NO. : 5,252,210

DATED : October 12, 1993

INVENTOR(S) : Kenneth C. Kessel

It is certified that error appears in the above-identified patent and that said Letters Patent is hereby corrected as shown below:

In Column 8, Line 5, before "a", insert --(a)--

In Column 8, Line 23, after "medium", insert --,--

In Column 8, delete lines 40-44

Signed and Sealed this

Nineteenth Day of July, 1994

Attest:

BRUCE LEHMAN

*Attesting Officer*   *Commissioner of Patents and Trademarks*